United States Patent
Takayama et al.

(10) Patent No.: US 9,941,780 B2
(45) Date of Patent: Apr. 10, 2018

(54) POWER CONVERSION DEVICE WITH CORRECTION OF REACTOR INDUCTANCE BASED ON DETECTED CURRENT

(71) Applicant: Mitsubishi Electric Corporation, Tokyo (JP)

(72) Inventors: Yuji Takayama, Tokyo (JP); Takashi Yamakawa, Tokyo (JP); Koichi Arisawa, Tokyo (JP); Shigeo Umehara, Tokyo (JP); Tomomi Higashikawa, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/510,277

(22) PCT Filed: Sep. 30, 2014

(86) PCT No.: PCT/JP2014/076016
§ 371 (c)(1),
(2) Date: Mar. 10, 2017

(87) PCT Pub. No.: WO2016/051487
PCT Pub. Date: Apr. 7, 2016

(65) Prior Publication Data
US 2017/0302150 A1    Oct. 19, 2017

(51) Int. Cl.
*H02M 1/42*    (2007.01)
*H02M 1/08*    (2006.01)
(Continued)

(52) U.S. Cl.
CPC ............. *H02M 1/08* (2013.01); *H02M 7/06* (2013.01); *H02M 2001/0048* (2013.01); *H02M 2001/4283* (2013.01)

(58) Field of Classification Search
CPC ......... H02M 1/4208; H02M 201/4283; H02M 1/4266; H02M 1/40; H02M 7/217; H02J 3/1864
See application file for complete search history.

(56) References Cited

U.S. PATENT DOCUMENTS

| | | | | |
|---|---|---|---|---|
| 4,831,508 | A * | 5/1989 | Hunter | H02M 1/4208 363/126 |
| 6,181,539 | B1 * | 1/2001 | Maejima | H02M 1/4208 361/22 |
| 2014/0153304 | A1 * | 6/2014 | Angkititrakul | H02M 1/4208 363/126 |

FOREIGN PATENT DOCUMENTS

| | | |
|---|---|---|
| JP | 2001-169553 | 6/2001 |
| JP | 2006-174689 A | 6/2006 |

(Continued)

OTHER PUBLICATIONS

International Search Report of the International Searching Authority dated Dec. 9, 2014 for the corresponding international application No. PCT/JP2014/076016 (and English translation).

(Continued)

*Primary Examiner* — Harry Behm
(74) *Attorney, Agent, or Firm* — Posz Law Group, PLC

(57) ABSTRACT

A power converting apparatus includes a rectifier converting alternating-current power from an alternating-current power supply into direct-current power; a short-circuit unit short-circuiting the alternating-current power supply via a reactor; and a controlling unit controlling the short-circuit unit in a half cycle of the alternating-current power supply. A correction amount using inductance of the reactor is set in the controlling unit, and the controlling unit changes, using at least a detection value of a power supply current and the correction amount, an ON time and an OFF time of a plurality of switching pulses, and controls, using changed switching pulses, an ON/OFF operation of the short-circuit unit.

9 Claims, 9 Drawing Sheets

(51) Int. Cl.
*H02M 7/06* (2006.01)
*H02M 1/00* (2006.01)

(56) References Cited

FOREIGN PATENT DOCUMENTS

| | | |
|---|---|---|
| JP | 2011-155813 | 8/2011 |
| JP | 2013-106455 A | 5/2013 |
| JP | 2015-070724 A | 4/2015 |
| JP | 2015-171196 A | 9/2015 |

OTHER PUBLICATIONS

Office Action dated Jan. 9, 2018 issued in corresponding JP patent application No. 2016-551374 (and English translation).

* cited by examiner

CURRENT PATH AT ON TIME OF SHORT-CIRCUIT ELEMENT

CURRENT PATH AT OFF TIME OF SHORT-CIRCUIT ELEMENT

STARTING TIME OF SHORT CIRCUIT

DURATION OF SHORT CIRCUIT

Vs

Sa

Sa1

Is

Vs

Sa

Sa1

UPPER THRESHOLD
LOWER THRESHOLD
Is

POWER CONVERSION DEVICE WITH CORRECTION OF REACTOR INDUCTANCE BASED ON DETECTED CURRENT

CROSS REFERENCE TO RELATED APPLICATION

This application is a U.S. national stage application of International Patent Application No. PCT/JP2014/076016 filed on Sep. 30, 2014, the disclosure of which is incorporated herein by reference.

TECHNICAL FIELD

The present invention relates to a power converting apparatus that converts alternating-current power into direct-current power.

BACKGROUND

The direct-current power supply apparatus of Patent Literature 1 described below includes a rectifying unit that rectifies an alternating-current voltage; a double voltage rectifier circuit; a switching unit that short-circuits an alternating-current power supply via a reactor; a controlling unit that opens and closes the switching unit; and a storage unit that stores the switching unit's drive pattern, which is a pattern in accordance with the load. The direct-current power supply apparatus is configured such that the switching unit operates in accordance with the drive pattern stored in advance.

The direct-current power supply apparatus of Patent Literature 2 described below includes a rectifier circuit; a reactor connected to the rectifier circuit; a switching unit that short-circuits an alternating-current power supply via the reactor; a short-circuit timing storage unit that stores short-circuit timing for the switching unit; an inductance storage unit that stores the inductance value of the reactor; a switching control unit that controls opening and closing of the switching unit; and an inductance estimation unit. In the direct-current power supply apparatus of Patent Literature 2 described below, on the basis of the short-circuit timing stored in the short-circuit timing storage unit, the inductance value of the reactor estimated by the inductance estimation unit, and information on the voltage and current detected by a detection unit, the duration of a short circuit is determined and the switching unit is controlled. Alternatively, on the basis of the short-circuit timing stored in the short-circuit timing storage unit, the inductance value stored in the inductance storage unit, and information on the voltage and current detected by the detection unit, the duration of a short circuit is determined and the switching unit is controlled.

PATENT LITERATURE

Patent Literature 1: Japanese Patent Application Laid-Open No. 2006-174689
Patent Literature 2: Japanese Patent Application Laid-Open No. 2013-106455

With the conventional technology indicated in Patent Literature 1 and described above, variations in inductance of the reactor caused by a change in the instantaneous current are not taken into consideration. Therefore, with the conventional technology indicated in Patent Literature 1 described above, the magnitude of the instantaneous current flowing to the reactor changes, and consequently it is difficult to obtain desired waveform shape, power factor, harmonics, and voltage boosting performance.

Furthermore, with the conventional technology indicated in Patent Literature 2 and described above, complicated calculations that take into account variations in inductance of the reactor are required. Therefore, a problem arises in that the design workload in order to obtain desired waveform shape, power factor, harmonics, and voltage boosting performance increases, and a long period of time is required for the process of calculating the duration of a short circuit.

SUMMARY

The present invention has been achieved in view of the above, and an object of the present invention is to provide a power converting apparatus that can have an improved power factor, suppress harmonic components, or suppress circuit losses while having a reduced design workload.

In order to solve the above problems and achieve the object, a power converting apparatus according to an aspect of the present invention includes: a rectifier converting alternating-current power from an alternating-current power supply into direct-current power; a short-circuit unit short-circuiting the alternating-current power supply via a reactor; and a controlling unit controlling the short-circuit unit in a half cycle of the alternating-current power supply. A correction amount using inductance of the reactor is set in the controlling unit, and the controlling unit changes, using at least a detection value of a power supply current and the correction amount, an ON time and an OFF time of a plurality of switching pulses, and controls, using the changed switching pulses, an ON/OFF operation of the short-circuit unit.

ADVANTAGEOUS EFFECTS OF INVENTION

The power converting apparatus according to the present invention achieves an effect of improving a power factor, suppressing harmonic components, or suppressing circuit losses while having a reduced design workload.

DETAILED DESCRIPTION

A power converting apparatus according to an embodiment of the present invention will be described in detail below with reference to the drawings. The present invention is not limited to the embodiment.

Embodiment

Figure 1:
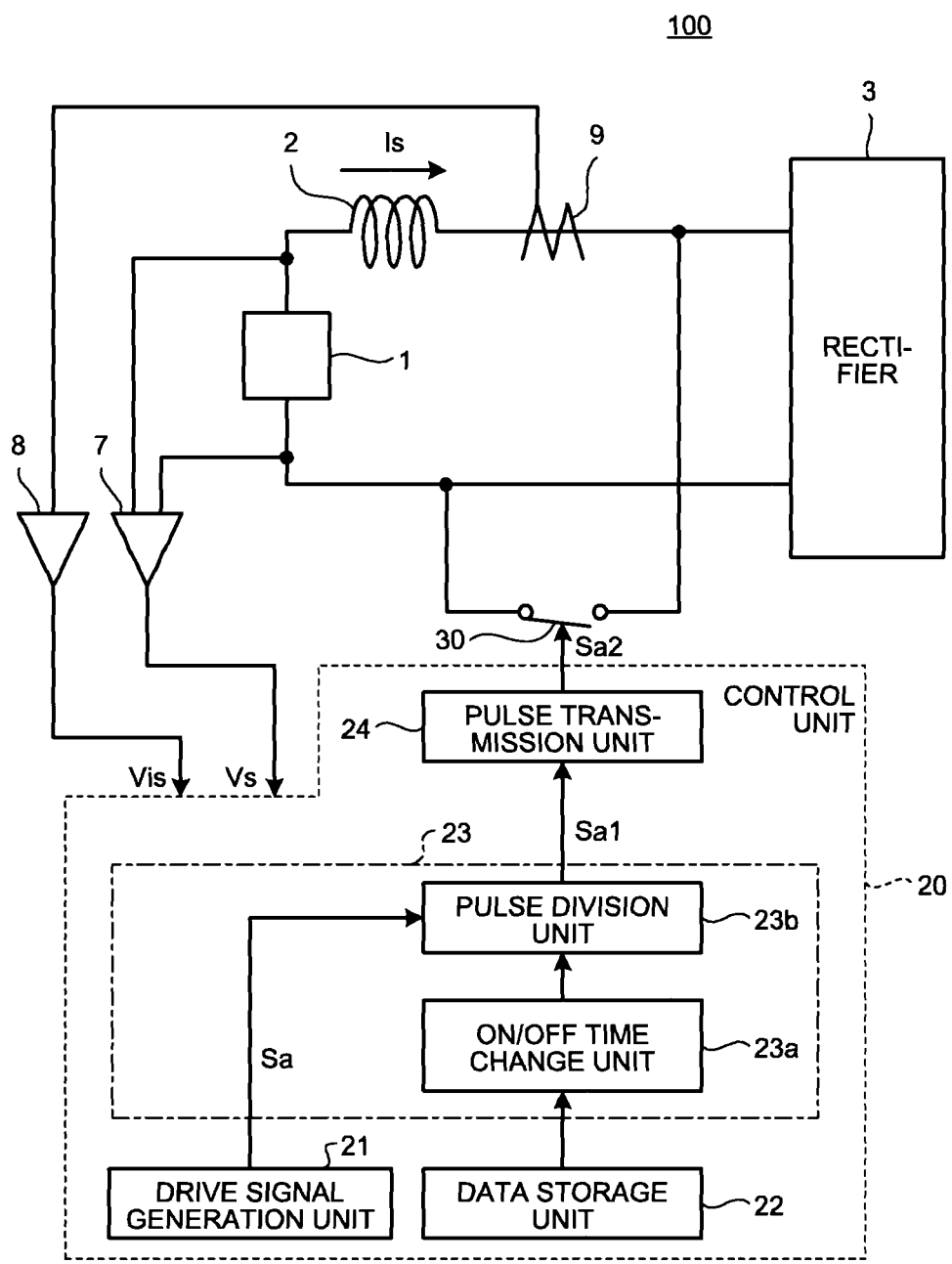
FIG. 1 is a diagram illustrating an example configuration of a power converting apparatus according to an embodiment of the present invention.

FIG. 1 is a diagram illustrating an example configuration of a power converting apparatus 100 according to an embodiment of the present invention. The power converting apparatus 100 includes a rectifier 3 that converts alternating-current power from an alternating-current power supply 1, which is a power supply unit, into direct-current power; a reactor 2 connected between the alternating-current power supply 1 and the rectifier 3; a power-supply-voltage detection unit 7 that detects a power supply voltage Vs from the alternating-current power supply 1; a current detection element 9 that is connected between the reactor 2 and the rectifier 3 and that detects the value of the electric current at the position of the connection; a current detection unit 8 that converts the voltage in proportion to the current detected by the current detection element 9 into a current detection voltage Vis in the voltage range that is low enough for a controlling unit 20 to handle, and outputs the current detection voltage Vis; a short-circuit unit 30 that short-circuits the alternating-current power supply 1 via the reactor 2, and the controlling unit 20 that generates a drive signal Sa2, which is a plurality of switching pulses, in a half cycle of the alternating-current power supply 1, and controls the open/close operation of the short-circuit unit 30 with the generated drive signal Sa2.

The reactor 2 is connected closer to the alternating-current power supply 1 than to the short-circuit unit 30 and is inserted between one input terminal of the rectifier 3 and the alternating-current power supply 1. A current transformer and a shunt resistor are examples of the current detection element 9. The current detection unit 8 is realized by an amplifier or a level shift circuit.

Figure 2:
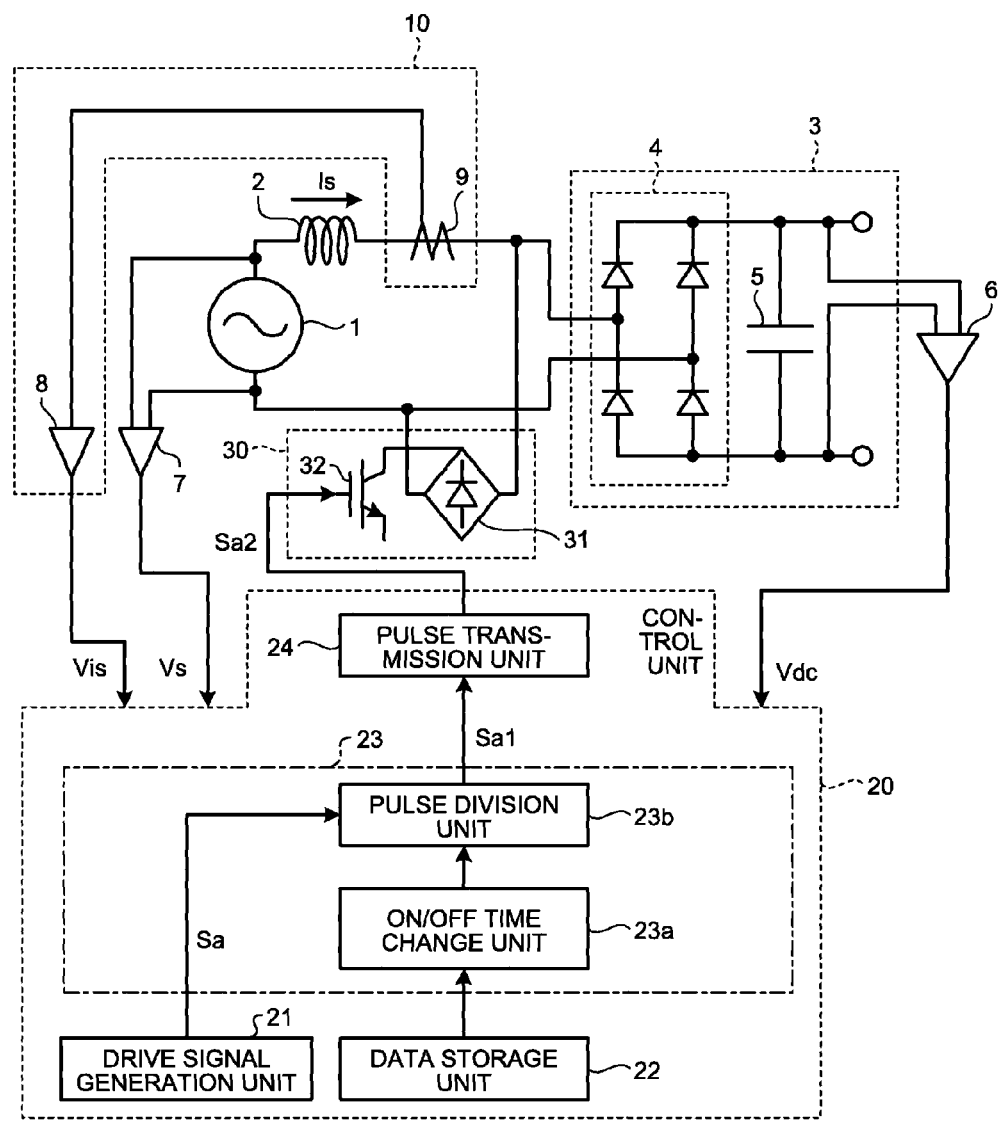
FIG. 2 is a diagram illustrating an example configuration of a rectifier and a short-circuit unit illustrated in FIG. 1.

FIG. 2 is a diagram illustrating an example configuration of the rectifier 3 and the short-circuit unit 30 illustrated in FIG. 1. The rectifier 3 includes a rectifier circuit 4 and a smoothing capacitor 5. The rectifier circuit 4 includes a diode bridge 31 obtained by combining four diodes. The smoothing capacitor 5 is connected between the output terminals of the rectifier circuit 4, and smooths the voltage of a full-wave rectified waveform output from the rectifier circuit 4. In FIG. 2, a current detector 10 including the current detection element 9 and the current detection unit 8 is illustrated, and a power supply current Is of the alternating-current power supply 1 is detected by the current detector 10.

A direct-current voltage detection unit 6 is realized by an amplifier or a level shift circuit, and it detects the voltage across the smoothing capacitor 5; converts the detected voltage into a direct-current output voltage Vdc, which is a voltage detection value in the voltage range that is low enough for the controlling unit 20 to handle; and outputs the direct-current output voltage Vdc. The configuration of the rectifier circuit 4 is not limited thereto, and the rectifier circuit 4 may be configured as a combination of metal-oxide semiconductor field effect transistors, which are diode-connected one-way conducting elements.

The short-circuit unit 30, which is a bidirectional switch, includes the diode bridge 31 connected in parallel to the alternating-current power supply 1 via the reactor 2 and a short-circuit element 32 connected to both output terminals of the diode bridge 31. The short-circuit unit 30 is configured such that when the short-circuit element 32 is a metal-oxide semiconductor field effect transistor, the gate of the short-circuit element 32 is connected to a pulse transmission unit 24, and the short-circuit element 32 is turned on or off by the drive signal Sa2 from the pulse transmission unit 24. When the short-circuit element 32 is turned on, the alternating-current power supply 1 is short-circuited via the reactor 2 and the diode bridge 31.

The controlling unit 20 is constructed from a microcomputer, and it includes a drive signal generation unit 21, a data storage unit 22, a pulse pattern generation unit 23, and the pulse transmission unit 24. The drive signal generation unit 21 generates a drive signal Sa, which is a switching pulse for controlling the short-circuit element 32, on the basis of the direct-current output voltage Vdc and the power supply voltage Vs. The data storage unit 22 stores data required for calculations performed in the pulse pattern generation unit 23. The pulse pattern generation unit 23 generates a drive signal Sa1, which is a pulse pattern including a plurality of pulses, on the basis of data read from the data storage unit 22 and the drive signal Sa from the drive signal generation unit 21. The pulse transmission unit 24 converts the drive signal Sa1 from the pulse pattern generation unit 23 into the drive signal Sa2, and transmits the drive signal Sa2 to the short-circuit unit 30.

The data stored in the data storage unit 22 includes data regarding an approximate formula of a function in which the ON duty ratio and the pulse number of each drive signal Sa1 are associated with each other, data regarding an approximate formula of a function in which the OFF duty ratio and the pulse-interval number of each drive signal Sa1 are associated with each other, and data regarding constants for the approximate formulae. The ON duty ratio is the ratio of the ON time of each drive signal Sa1 to the ON time of the drive signal Sa, and the OFF duty ratio is the ratio of the OFF time of each drive signal Sa1 to the ON time of the drive signal Sa. Details of the data will be described later.

The pulse pattern generation unit 23 includes an on/off time change unit 23a and a pulse division unit 23b. The on/off time change unit 23a changes, on the basis of at least a detection value of the power supply current Is and a correction amount, ON times and OFF times of a plurality of switching pulses that control the short-circuit unit 30. The pulse division unit 23b divides the drive signal Sa by the changed ON times and OFF times, and generates the drive signal Sa1. Details of the correction amount will be described later.

The pulse transmission unit 24 includes a level shift circuit, and it shifts a voltage level such that a gate can be driven; converts the drive signal Sa1 from the pulse pattern generation unit 23 into the drive signal Sa2, which is a gate drive signal; and outputs the drive signal Sa2 to the short-circuit unit 30.

The relationship between the drive signal Sa1 generated by the pulse pattern generation unit 23 and the power supply current Is will be described using FIGS. 3 to 7.

Figure 3:
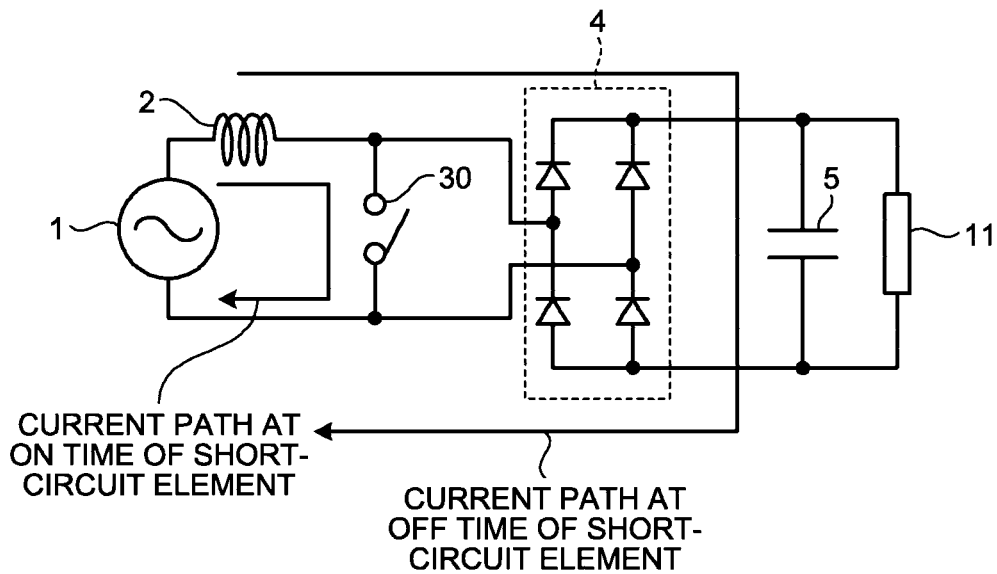
FIG. 3 is diagram illustrating a simple circuit including a reactor, the short-circuit unit, a rectifier circuit, and a smoothing capacitor.

FIG. 3 is a diagram illustrating a simple circuit including the reactor 2, the short-circuit unit 30, the rectifier circuit 4, and the smoothing capacitor 5. In FIG. 3, respective current paths at ON/OFF times of the short-circuit unit 30 are illustrated.

Figure 4:
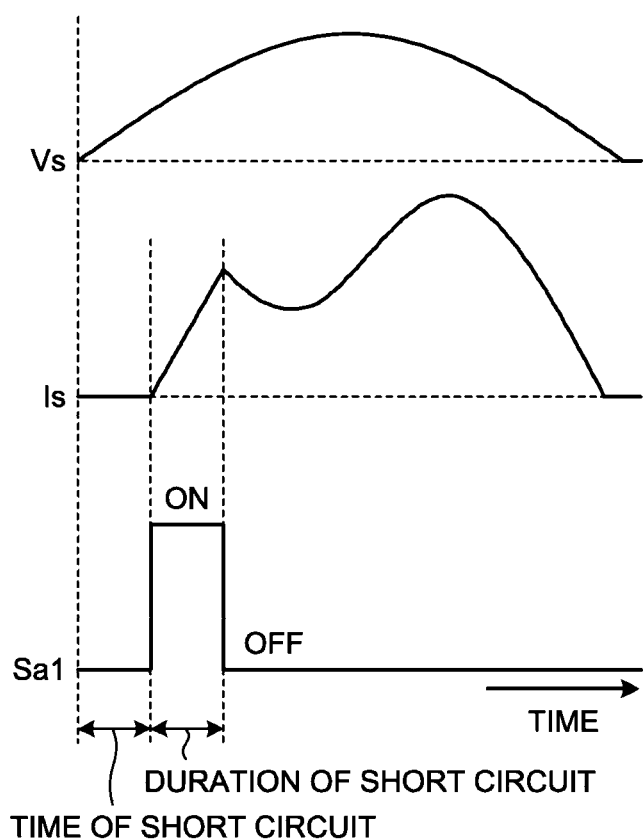
FIG. 4 is a diagram illustrating the waveform of a power supply current obtained when a short-circuit element is switched once in a half cycle on the positive polarity side of an alternating-current power supply.

FIG. 4 is a diagram illustrating the waveform of the power supply current Is obtained when the short-circuit element 32 is switched once in a half cycle on the positive polarity side of the alternating-current power supply 1. In FIG. 4, the drive signal Sa1, which is a single pulse obtained when the short-circuit unit 30 is switched once in a half cycle of the power supply, is illustrated. When the short-circuit unit 30 is turned on, a closed circuit is formed by the alternating-current power supply 1, the reactor 2, and the short-circuit unit 30, and the alternating-current power supply 1 is short-circuited via the reactor 2. Consequently, the power supply current Is flows to the closed circuit, and magnetic energy given by the formula of $(\frac{1}{2}) \times LI^2$ is accumulated in the reactor 2. The accumulated energy is released to a load 11 side at the same time as the short-circuit unit 30 is turned off, rectified by the rectifier circuit 4, and transferred to the smoothing capacitor 5. Through this series of operations, the power supply current Is flows along the current path in FIG. 2. Accordingly, it is possible to increase the conduction angle of the power supply current Is in comparison with a case of a passive mode in which the power factor is not improved and thus to improve the power factor.

Figure 5:
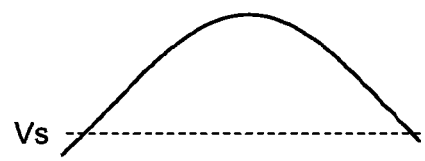
FIG. 5 is a diagram illustrating the waveform of a power supply current obtained when a drive signal is not divided into a plurality of pulses.
Figure 5:
Figure 5:
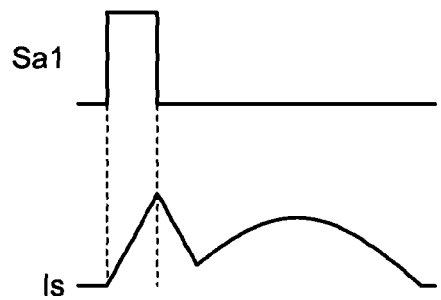

FIG. 5 is diagram illustrating the waveform of the power supply current Is obtained when the drive signal Sa is not divided into a plurality of pulses. The drive signal Sa1 is turned on at the same time as the drive signal Sa is turned on, and during an ON period t of the drive signal Sa, the drive signal Sa1 is on for the same period as the ON period t of the drive signal Sa. The ON period t is a period from when the drive signal Sa is turned on to when the drive signal Sa is turned off. Therefore, the short-circuit time of the short-circuit element 32 gets longer in proportion to the ON period t of the drive signal Sa when the power supply voltage Vs increases, and the power supply current Is increases. When the power supply current Is reaches a set value, the drive signal Sa is turned off, and the drive signal Sa1 is turned off at the same time as the drive signal Sa is turned off. In a case where the short-circuit time of the short-circuit element 32 is lengthened, although more energy can be accumulated in the reactor 2, the peak of the power supply current Is becomes larger. Therefore, there arise problems such as deteriorated power factors, increased harmonic components, and increased circuit losses.

Figure 6:
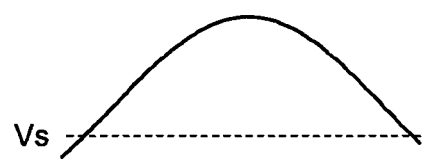
FIG. 6 is a diagram illustrating the waveform of a power supply current obtained when a drive signal is divided into a plurality of pulses.
Figure 6:
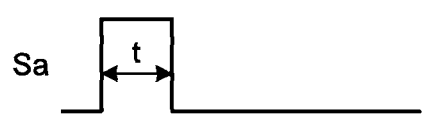
Figure 6:
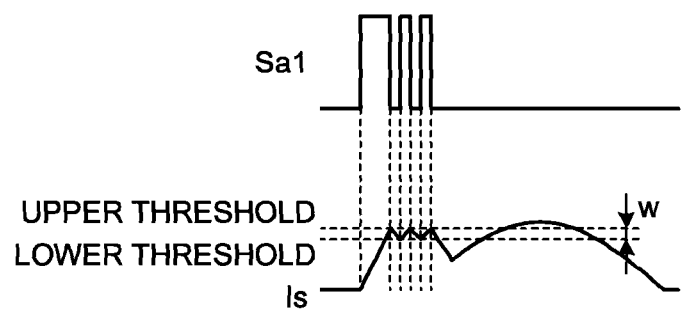

FIG. 6 is a diagram illustrating the waveform of the power supply current Is obtained when the drive signal Sa is divided into a plurality of pulses. An upper limit threshold illustrated in FIG. 6 is a threshold that regulates the upper limit of the short-circuit current flowing when the short-circuit unit 30 is turned on, and a lower limit threshold is a threshold set at a value lower than the upper limit threshold.

A current control range w refers to the width from the upper limit threshold to the lower limit threshold. FIG. 6 illustrates a plurality of drive signals Sa1 generated in a half cycle of the power supply such that peak values of the power supply current Is are within the current control range w.

The drive signal Sa1 is turned on at the same time as the drive signal Sa is turned on, and the power supply current Is increases. With the increase in the power supply current Is, the current detection voltage Vis, i.e., the current detection value detected by the current detection unit 8, rises. When the current detection value exceeds the upper limit threshold during the ON period of the drive signal Sa, the drive signal Sa1 is turned off. Consequently, the power supply current Is decreases and the current detection value drops. Thereafter, when the current detection value drops below the lower limit threshold during the ON period of the drive signal Sa, the drive signal Sa1 is turned on again, the power supply current Is increases again, and the current detection value detected by the current detection unit 8 rises.

By repeatedly turning the drive signal Sa1 on and off during the ON period t of the drive signal Sa, peak values of the current detection voltage Vis, i.e., peak values of the power supply current Is, during the ON period t of the drive signal Sa are controlled so as to be within the current control range w. Accordingly, even in a case where the direct-current output voltage Vdc is increased to a relatively high value, the peak values of the power supply current Is during the ON period t of the drive signal Sa are suppressed.

Figure 7:
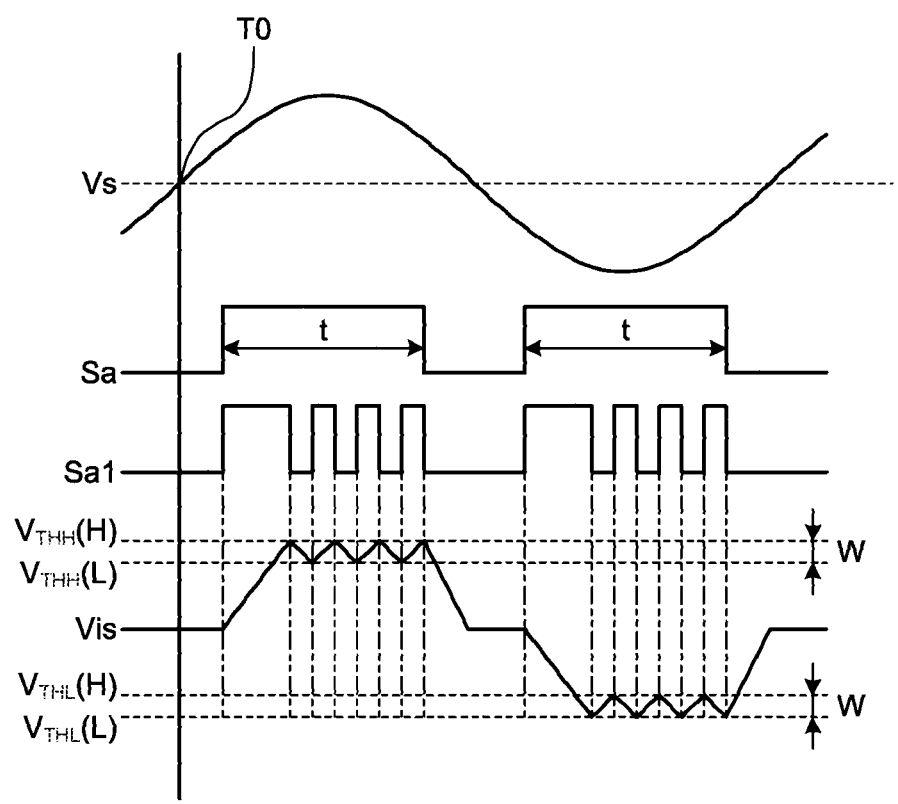
FIG. 7 is a diagram illustrating the waveform of a power supply current obtained when a drive signal is divided into a plurality of pulses in a half cycle on the positive polarity side and a half cycle on the negative polarity side.

FIG. 7 is diagram illustrating the waveform of the power supply current Is obtained when the drive signal Sa is divided into a plurality of pulses in a half cycle on the positive polarity side and a half cycle on the negative polarity side. By repeatedly turning the drive signal Sa1 on and off on the positive polarity side, the peak values of the power supply current Is on the positive polarity side are within the current control range w from a positive-polarity-side upper limit threshold $V_{THH}(H)$ to a positive-polarity-side lower limit threshold $V_{THH}(L)$. In addition, by repeatedly turning the drive signal Sa1 on and off on the negative polarity side, the peak values of the power supply current Is on the negative polarity side are within the current control range w from a negative-polarity-side upper limit threshold $V_{THL}(H)$ to a negative-polarity-side lower limit threshold $V_{THL}(L)$.

In the present invention, attention is focused on the manner of changes over time of ON/OFF times of a plurality of drive signals Sa1 generated in a half cycle of the power supply to be such that the peak values of the power supply current Is are within the current control range w. In a preliminary analysis, data in which the ON duty ratio and the pulse number of each drive signal Sa1 are associated with each other, and data in which the OFF duty ratio and the pulse-interval number of each drive signal Sa1 are associated with each other are obtained on the basis of the ON/OFF times of each drive signal Sa1 with which the peak values of the power supply current Is fall within the current control range w during the ON period t of the drive signal Sa. The data thus obtained are stored in the data storage unit 22. In the pulse pattern generation unit 23, the drive signals Sa1, which are such a pulse pattern as that illustrated in FIG. 7, are generated using the data stored in the data storage unit 22. In addition, by moving ON/OFF duty ratios with a correction amount corresponding to a load, the pulse pattern generation unit 23 generates the drive signals Sa1 such that the peak values of the power supply current Is are within the current control range w even when the load is changed.

Specific examples of the data stored in the data storage unit 22 and the relationship between the data and the drive signals Sa1 generated in the pulse pattern generation unit 23 will be described here.

Figure 8:
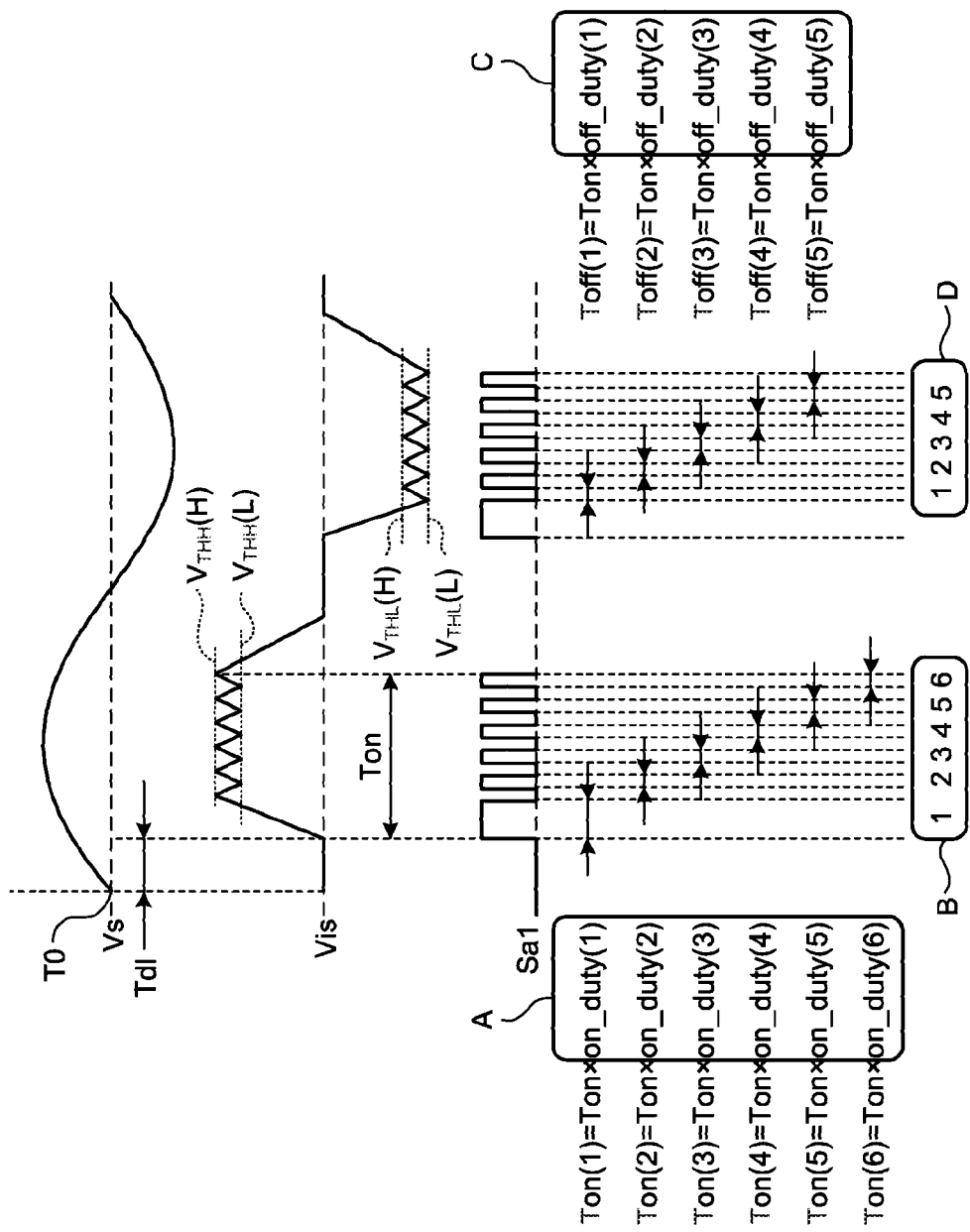
FIG. 8 is a diagram illustrating the relationship between data stored in a data storage unit and drive signals generated in a pulse pattern generation unit.

FIG. 8 is a diagram illustrating the relationship between the data stored in the data storage unit 22 and the drive signals Sa1 generated in the pulse pattern generation unit 23. FIG. 8 illustrates six drive signals Sa1 generated during the ON period t of the drive signal Sa in a half cycle on the positive polarity side and six drive signals Sa1 generated during the ON period t of the drive signal Sa in a half cycle on the negative polarity side.

When a certain period of time Td1 has elapsed from a zero-cross point T0 of the power supply voltage Vs that will increase, the first drive signal Sa1 is turned on. Ton(1) refers to the ON time of the first drive signal Sa1 generated in the half cycle on the positive polarity side, i.e., a period of time from rising to falling of the first drive signal Sa1. Similarly, Ton(2) refers to the ON time of the second drive signal Sa1, Ton(3) refers to the ON time of the third drive signal Sa1, Ton(4) refers to the ON time of the fourth drive signal Sa1, Ton(5) refers to the ON time of the fifth drive signal Sa1, and Ton(6) refers to the ON time of the sixth drive signal Sa1. Each of on_duty(1) to on_duty(6) indicated by reference sign A is one of data stored in the data storage unit 22, in which the ON duty ratio and the pulse number of each drive signal Sa1 are associated with each other. The number indicated by reference sign B is the pulse number. By multiplying the ON time Ton of the drive signal Sa by the ON duty ratio, the ON times Ton(1) to Ton(6) of respective drive signals Sa1 can be obtained.

When a certain period of time has elapsed from a zero-cross point of the power supply voltage Vs that will decrease, the first drive signal Sa1 is turned on. Toff(1) refers to a period of time from the falling of the first drive signal Sa1 generated in the half cycle on the negative polarity side to the rising of the second drive signal Sa1, i.e., the OFF time between the first and second drive signals Sa1. Similarly, Toff(2) refers to the OFF time between the second and third drive signals Sa1, Toff(3) refers to the OFF time between the third and fourth drive signals Sa1, Toff(4) refers to the OFF time between the fourth and fifth drive signals Sa1, and Toff(5) refers to the OFF time between the fifth and sixth drive signals Sa1. Each of off_duty(1) to off_duty(5) indicated by reference sign C is one of data stored in the data storage unit 22, in which the OFF duty ratio and the pulse-interval number of each drive signal Sa1 are associated with each other. The number indicated by reference sign D is the pulse-interval number. By multiplying the ON time Ton of the drive signal Sa by the OFF duty ratio, the OFF times Toff(1) to Toff(5) of respective drive signals Sa1 can be obtained. In addition, when a period of time from the zero-cross point T0 to the rising of the first drive signal Sa1 is retained as data, the ON/OFF timing of the short-circuit unit 30 can be specified.

Here, the following functions will be defined for calculating the ON duty ratios and OFF duty ratios illustrated in FIG. 8.

[Formula 1]

$$\text{on\_duty}(x) = \frac{T_{on}(x)}{T_{on}} \quad \{1 \leq x \leq N\} \quad (1)$$

[Formula 2]

$$\text{off\_duty}(y) = \frac{T_{off}(y)}{T_{on}} \quad \{1 \leq y \leq (N-1)\} \quad (2)$$

The formula (1) indicates the ON duty ratio of the ON time Ton(x) of an x-th drive signal Sa1 in a half cycle of the power supply with respect to the ON time Ton of the drive signal Sa. N is the total number of drive signals Sa1 generated in the half cycle of the power supply.

The formula (2) indicates the OFF duty ratio of the OFF time Toff(y) between the x-th drive signal Sa1 and an (x−1)th drive signal Sa1 in the half cycle of the power supply with respect to the ON time Ton of the drive signal Sa. N is the total number of drive signals Sa1 generated in the half cycle of the power supply.

Figure 9:
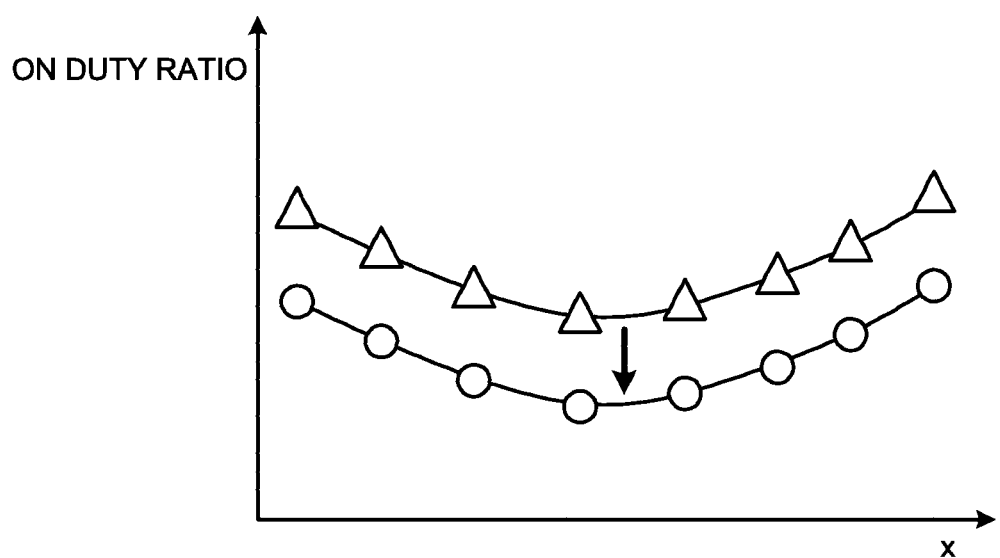
FIG. 9 is a graph illustrating the change with time of the ON duty ratio in a half cycle of a power supply calculated using the formula (1).

FIG. 9 is a graph illustrating the change with time of the ON duty ratio in the half cycle of the power supply calculated using the formula (1). The horizontal axis represents pulse numbers x of the second to an N-th drive signals Sa1 among N drive signals Sa1 generated in the half cycle of the power supply, and the vertical axis represents the ON duty ratios with respect to the second to the N-th drive signals Sa1 obtained by the formula (1). The curve made up of aligned triangular points is the ON duty ratio before being moved, and the curve made up of aligned circular points is the ON duty ratio after being moved. As illustrated in FIG. 9, for the ON duty ratio obtained when the peak values of the power supply current Is are within the current control range w, a parabola opening upward is drawn.

Figure 10:
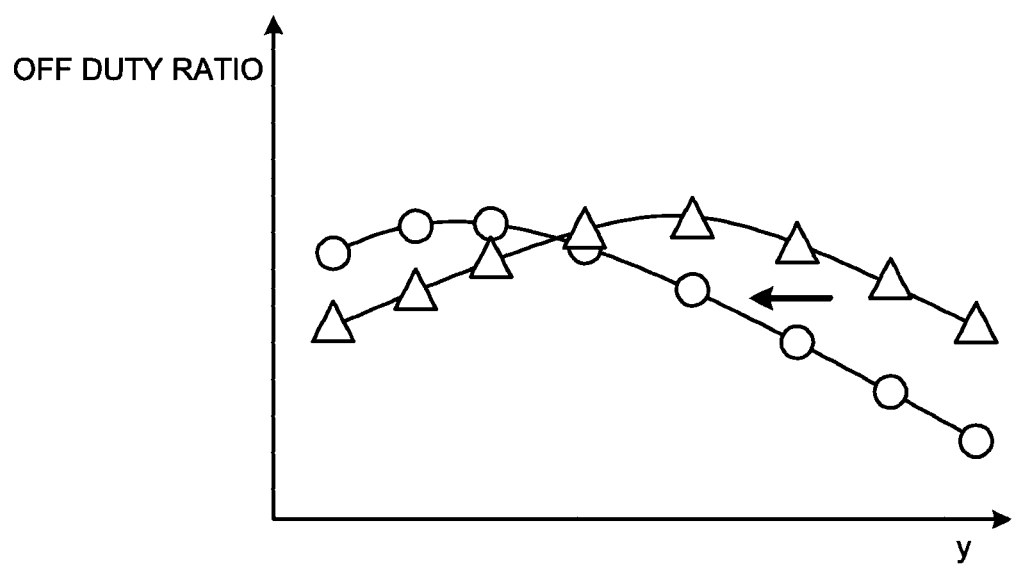
FIG. 10 is a graph illustrating the change with time of the OFF duty ratio in a half cycle of the power supply calculated using the formula (2).

FIG. 10 is a graph illustrating the change with time of the OFF duty ratio in the half cycle of the power supply calculated using the formula (2). The horizontal axis represents a pulse-interval number y of each drive signal Sa1 generated in the half cycle of the power supply, and the vertical axis represents values of the OFF duty ratios with respect to the first to the N-th drive signals Sa1 obtained by the formula (2). The curve made up of aligned triangular points is the OFF duty ratio before being moved, and the curve made up of aligned circular points is the OFF duty ratio after being moved. As illustrated in FIG. 10, for the OFF duty ratio obtained when the peak values of the power supply current Is are within the current control range, a parabola opening downward is drawn.

As described above, the ON duty ratios and the OFF duty ratios of a plurality of drive signals Sa1 generated in the half cycle of the power supply change with time and they change in different manners. When focusing attention on this point, the ON duty ratio of the drive signal Sa1 of a specified region among the drive signals Sa1 generated in the half cycle of the power supply and the OFF duty ratio of the drive signals Sa1 generated in the half cycle of the power supply can be represented by the following approximate formula.

The ON duty ratio of the formula (1) can be approximated by a second-degree formula represented by the formula (3). Note that $A_1$, $B_1$, and $C_1$ represent constants of the approximate formula.

[Formula 3]

$$\text{on\_duty}(x) = A_1 \cdot x^2 + B_1 \cdot x + C_1 \quad (3)$$

The OFF duty ratio of the formula (2) can be approximated by a second-degree formula represented by the formula (4). Note that $A_1$, $B_1$, and $C_1$ represent constants of the approximate formula.

[Formula 4]

$$\text{off\_duty}(y) = A_1 \cdot y^2 + B_1 \cdot y + C_1 \quad (4)$$

The ON duty ratio and the OFF duty ratio may be defined by a second- or higher-degree approximate formula.

The ON duty ratio of the first drive signal Sa1, which is a pulse in a region other than the specified region, can be represented by the formula (5). N is the total number of drive signals Sa1 generated in the half cycle of the power supply. As described above, regarding the ON time of the first drive signal Sa1, an error in the approximate formula can be absorbed by using the formula (5) without setting the ON duty ratio.

[Formula 5]

$$\text{on\_duty}(1) = 1 - \sum_{k=2}^{N} \text{on\_duty}(k) - \sum_{k=1}^{N-1} \text{off\_duty}(k) \quad (5)$$

It is possible to obtain, in a manner as described above, an approximate formula of a function in which the ON duty ratio and the pulse number of each drive signal Sa1 are associated with each other and an approximate formula of a function in which the OFF duty ratio and the pulse-interval number of each drive signal Sa1 are associated with each other. Data expressed as functions and data regarding constants of approximate formulae are stored in the data storage unit 22, and used when the pulse pattern generation unit 23 generates the drive signal Sa1.

Next, a correction amount Cq stored in the data storage unit 22 and the function of the pulse pattern generation unit 23 will be described using FIGS. 11 to 14.

Figure 11:
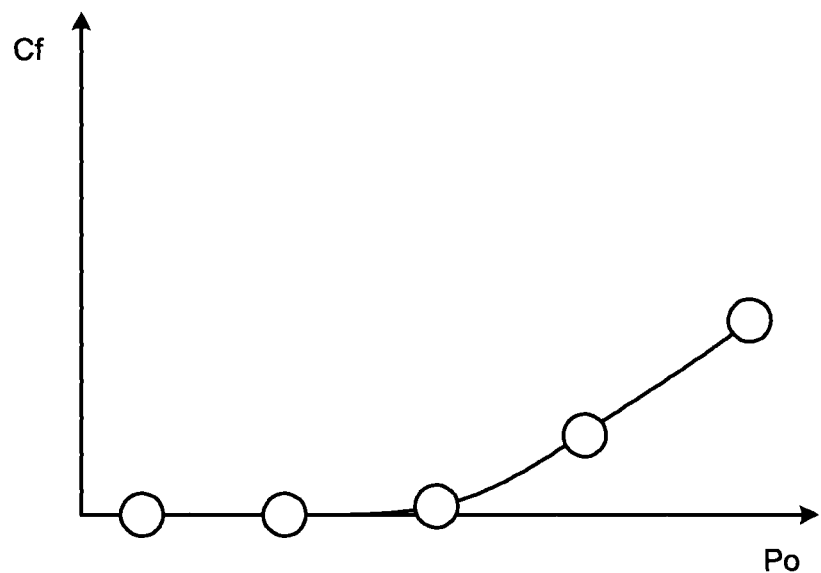
FIG. 11 is a graph illustrating the relationship between the load and the correction coefficient.

FIG. 11 is a graph illustrating the relationship between a load Po and a correction coefficient Cf. The load Po represented by the horizontal axis represents, for example, the value of power supplied to the load 11 illustrated in FIG. 3, and the correction coefficient Cf represented by the vertical axis represents a correction coefficient Cf corresponding to the value of the load Po. The correction coefficient Cf is a value obtained by an analysis or practical testing. For example, as illustrated in FIG. 11, the correction coefficient Cf is a value adjusted to exhibit a constant value in a region where the load Po is low and to increase with an increase in the load Po in a region where the load Po is high.

Figure 12:
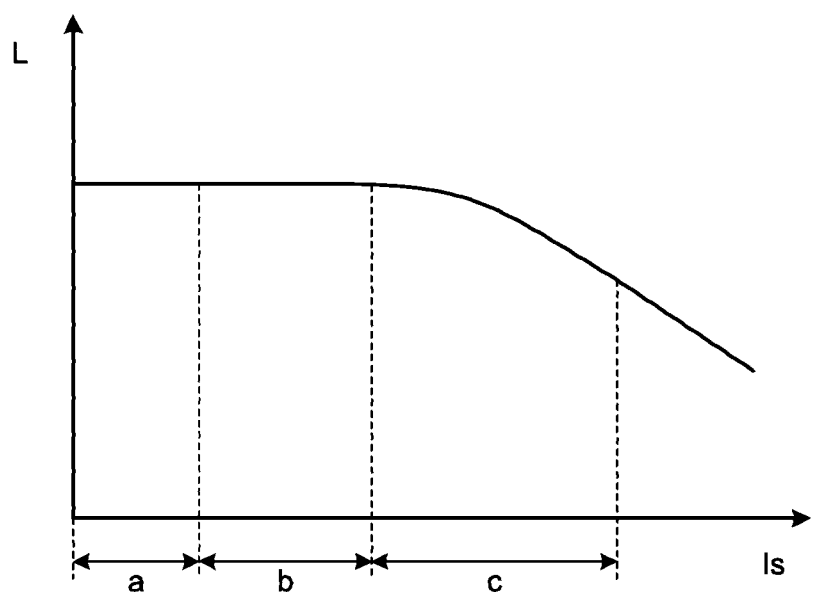
FIG. 12 is a graph illustrating the relationship between a power supply current flowing to the reactor and the inductance of the reactor.

FIG. 12 is a graph illustrating the relationship between the power supply current Is flowing to the reactor 2 and inductance L of the reactor 2. The horizontal axis represents the power supply current Is flowing to the reactor 2 and the vertical axis represents the inductance L of the reactor 2. As illustrated in FIG. 12, the inductance L exhibits a constant value in a region a where the power supply current Is is low and in a region b where the power supply current Is is higher than that in the region a. However, in a region c where the power supply current Is is higher than that in the region b, the inductance L tends to decrease with an increase in the power supply current Is.

Here, because an effective value of the power supply voltage Vs is constant, there is a correlation represented by the formula (6) between the load Po and the power supply current Is.

[Formula 6]

$$Po = Is \cdot Vs \quad (6)$$

The relationship between the inductance L and the power supply current Is can be approximated by the formula (7). Note that a, b, and c represent constants of the approximate formula.

[Formula 7]

$$L = a \cdot i^2 + b \cdot i + c \quad (7)$$

Because the formula (6) exhibits the correlation between the power supply current Is and the load Po, the relationship between the inductance L and the load Po in the formula (7) can be represented by the formula (8).

[Formula 8]

$$L = a \cdot Pc^2 + b \cdot Pc + c \quad (8)$$

The correction amounts Cq of the ON/OFF duty ratios respectively illustrated in FIGS. 9 and 10 can be represented by the formula (9). Cf denotes the correction coefficient illustrated in FIG. 11, L denotes inductance obtained by using the formula (8), and La denotes a change amount of the inductance L.

[Formula 9]

$$Cq = Cf(L - La) \quad (9)$$

As can be seen from the formula (9), the absolute value of the correction amount Cq increases with an increase in change amount of the inductance L and value of the correction coefficient Cf. The change amount of the inductance L is derived from a change value of the inductance L with respect to an increase in the power supply current Is, as illustrated in FIG. 12. Therefore, when the value of the power supply current Is or the load Po is obtained, the correction amount Cq can be derived.

In the on/off time change unit 23a, the correction amount Cq is obtained from approximate formulae of the ON/OFF duty ratios stored in the data storage unit 22, a value of the load Po, which is a power value calculated on the basis of the power supply voltage Vs and the current detection voltage Vis, the formula (8), and the formula (9). The ON duty ratio corresponding to the pulse number x is moved by the correction amount Cq as illustrated in FIG. 9, and the OFF duty ratio corresponding to the pulse-interval number y is moved by the correction amount Cq as illustrated in FIG. 10.

When the ON/OFF duty ratios are translated as illustrated in FIGS. 9 and 10, the moving amounts on the x-and y-coordinates of the ON/OFF duty ratios corresponding to the correction amounts Cq are determined in the on/off time change unit 23a. The moving amounts include a moving amount in the x-axis direction and a moving amount in the y-axis direction.

The formula (10) and the formula (11) represent the ON duty ratio before being moved and the ON duty ratio after being moved, respectively. In a case where the ON duty ratio corresponding to the pulse number is represented by a fourth-degree approximate formula, the ON duty ratio is translated from a position on the x- and y-coordinates by a determined moving amount, i.e., m in the x-axis direction and n in the y-axis direction.

[Formula 10]

$$y = a \cdot x^4 + b \cdot x^3 + c \cdot x^2 + d \cdot x + e \quad (10)$$

[Formula 11]

$$(y - n) = a \cdot (x - m)^4 + b \cdot (x - m)^3 + c \cdot (x - m)^2 + d \cdot (x - m) + e \quad (11)$$

In a case where the OFF duty ratio corresponding to the pulse-interval number is represented by a fourth-degree approximate formula, the OFF duty ratio is translated from a position on the x- and y-coordinates by a determined moving amount, i.e., −m in the x-axis direction and −n in the y-axis direction. By multiplying the ON/OFF duty ratios after being moved by the ON time of the drive signal Sa, which is an original signal, the ON/OFF times of the drive signal Sa1 can be obtained.

Figure 13:
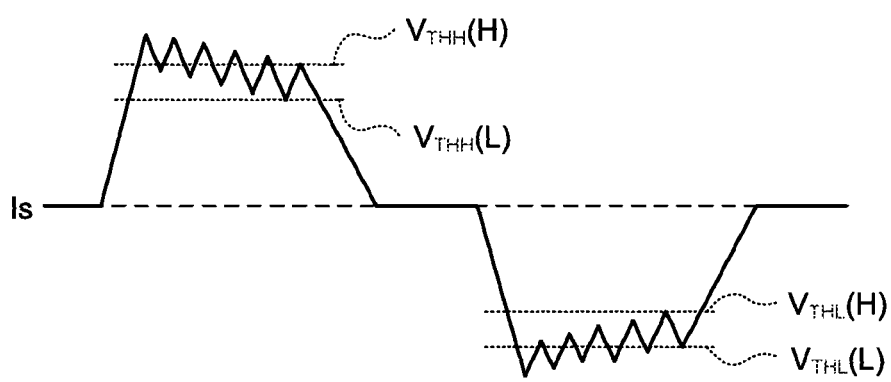
FIG. 13 is a diagram illustrating the waveform of a power supply current flowing when the short-circuit unit is controlled by the drive signals before the ON/OFF duty ratios are moved.
Figure 14:
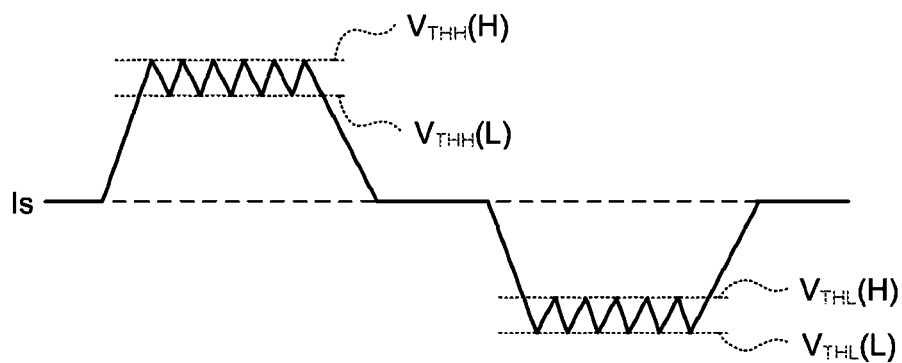
FIG. 14 is a diagram illustrating the waveform of a power supply current flowing when the short-circuit unit is controlled by the drive signals after the ON/OFF duty ratios are moved.

FIG. 13 is a diagram illustrating the waveform of the power supply current Is flowing when the short-circuit unit 30 is controlled by the drive signals Sa1 before the ON/OFF duty ratios are moved. FIG. 14 is a diagram illustrating the waveform of the power supply current Is flowing when the short-circuit unit 30 is controlled by the drive signals Sa1 after the ON/OFF duty ratios are moved.

When the inductance L of the reactor 2 is small, the waveform of the power supply current Is before correction exhibits a tendency to have peak values that are negatively sloped, as illustrated in FIG. 13. Specifically, the peak values of the power supply current Is on the positive polarity side increase toward the positive polarity side such that they overshoot the positive-polarity-side upper limit threshold $V_{THH}(H)$ obtained by a preliminary analysis, and then decrease gradually to fall within the current control range from the positive-polarity-side upper limit threshold $V_{THH}(H)$ to the positive-polarity-side lower limit threshold $V_{THH}(L)$. The peak values of the power supply current Is on the negative polarity side increase toward the negative polarity side such that they overshoot the negative-polarity-side lower limit threshold $V_{THL}(L)$ obtained by a preliminary analysis, and then decrease gradually to fall within the current control range from the negative-polarity-side upper limit threshold $V_{THL}(H)$ to the negative-polarity-side lower limit threshold $V_{THL}(L)$. By contrast, for the waveform of the power supply current Is after correction, as illustrated in FIG. 14, peak values of the power supply current Is are constant and are within the current control range of each of the positive polarity side and the negative polarity side. The peak values of the power supply current Is after correction may not necessarily be constant, and, for example, it is sufficient if the degree of the negative slope tendency is smaller than that before correction.

In the conventional technology indicated in Patent Literature 1 described above, variations in the inductance of the reactor caused by a change in the current flowing at the moment the short-circuit unit is turned on is not taken into consideration. Therefore, as illustrated in FIG. 13, the waveform of the power supply current Is changes, and thus peaks of the power supply current Is become larger. As a result, problems arise such as deteriorated power factors, increased harmonic components, and increased circuit losses. On the other hand, in a case where the direct-current output voltage is increased while the amount of generated harmonics is suppressed to a certain level, because there is a limit to the voltage boosting ability, operations on the high load side become unstable, or the selection range of the load is narrowed when consideration is given to stable operations on the high load side.

In the conventional technology in Patent Literature 2 described above, complicated calculations that take into consideration variations in inductance are required. Therefore, there are problems in that a design workload increases and that a long period of time is required for the process of calculating the duration of a short circuit.

According to the present embodiment, it is possible to offset the variations in inductance of the reactor 2 caused by a change in an instantaneous current by moving the ON/OFF duty ratios on the x- and y-coordinates by a set correction amount. Consequently, it is possible to improve the power factor, suppress harmonic components, suppress an increase in circuit loss, or obtain a desired voltage boosting ability without performing such complicated calculations as indicated in Patent Literature 2 described above.

An operation of the configuration illustrated in FIG. 1 will be described below. The on/off time change unit 23a reads the approximate formulae for the ON/OFF duty ratios stored in the data storage unit 22, obtains the inductance L of the reactor 2 from the power value calculated on the basis of the power supply voltage Vs and the current detection voltage Vis, and the formula (8), and obtains the correction amount Cq from the inductance L and the formula (9). Furthermore, in the on/off time change unit 23a, the ON duty ratio corresponding to the pulse number x is moved by the correction amount Cq, the OFF duty ratio is moved by the correction amount Cq, and the on/off time change unit 23a obtains the ON/OFF times of the drive signal Sa1 by multiplying the ON/OFF duty ratios after being moved by the ON time of the drive signal Sa, which is an original signal. The pulse division unit 23b generates the drive signal Sa1 by dividing the drive signal Sa by the changed ON/OFF times. In the above-described manner, the drive signal Sa1 corresponding to the change in the inductance L is generated easily in the controlling unit 20.

In the present embodiment, an example configuration has been described in which the correction amount Cq is obtained from the calculated load Po, the formula (8), and the formula (9). However, because there is also a correlation between the inductance L and the power supply current Is as indicated by the formula (7), a configuration may be employed in which the correction amount Cq is obtained from the detection value of the power supply current Is, the formula (7), and the formula (9). In addition, in the present embodiment, the example configuration has been described in which the ON/OFF duty ratios are moved by the correction amount Cq represented by the formula (9). However, the value of the inductance L obtained from the formula (7) or the formula (8) may be used as the moving amount of the ON/OFF duty ratios instead of the correction amount Cq of the formula (9), which makes it possible to further reduce the design workload of data set in the controlling unit 20. In addition, each of the functions represented by the formula (7) and the formula (8) is not limited to a second-degree approximate formula, and they may be represented by a second- or higher-degree approximate formula. In addition, in the present embodiment, the example configuration has been described in which both the ON time and the OFF time are changed. However, the ON time or the OFF time may be a constant value and the drive signal Sa1 may be generated by dividing the drive signal Sa by the ON/OFF times.

In addition, in the present embodiment, the reactor 2 is inserted between the alternating-current power supply 1 and the rectifier 3, and the rectifier 3 is connected to the alternating-current power supply 1 via the reactor 2. However, because it is sufficient if the power converting apparatus 100 is capable of opening and closing the power supply via the reactor 2, the positional relationship of the rectifier 3, the reactor 2, and the short-circuit unit 30 is not limited to the configuration in the illustrated example. In other words, it is sufficient if the power converting apparatus 100 has a configuration in which the power supply current Is flows to the alternating-current power supply 1, the reactor 2, the short-circuit unit 30, and the alternating-current power supply 1, in this order upon a short circuit. For example, a configuration may be employed in which the rectifier 3 is inserted between the alternating-current power supply 1 and the reactor 2, and the reactor 2 is connected to the alternating-current power supply 1 via the rectifier 3.

In addition, in the present embodiment, although an example has been given in which the ON/OFF duty ratios are expressed as functions, there is no limitation thereto. The following configuration may be employed. For example, data on the ON time and OFF time expressed as functions or data in which the ON time and the OFF time are represented by a second- or higher-degree approximate formula is set in the on/off time change unit 23a; the on/off time change unit 23a moves the ON time corresponding to the pulse number and the OFF time corresponding to the pulse-interval number by the correction amount Cq in order to change the ON time and the OFF time; and the pulse division unit 23b generates the drive signal Sa1 with the changed ON time and OFF time. In addition, the following configuration may be employed, for example. A map table is set in the on/off time change unit 23a. In the map table, the ON time and the OFF time of each switching pulse, the pulse number of each switching pulse, and the pulse-interval number of each switching pulse are associated with one another. The on/off time change unit 23a moves the ON time corresponding to the pulse number and the OFF time corresponding to the pulse-interval number by the correction amount. It is possible to reduce the inclination of a change in peak values of the power supply current Is over time also by using this configuration.

As described above, the power converting apparatus 100 according to the present embodiment includes the rectifier 3, which converts alternating-current power from the alternating-current power supply 1 into direct-current power; the short-circuit unit 30, which short-circuits the alternating-current power supply 1 via the reactor 2; and the controlling unit 20, which controls the short-circuit unit 30 in a half cycle of the alternating-current power supply 1. The correction amount Cq in accordance with the inductance of the reactor 2 is set in the controlling unit 20, and the controlling unit 20 changes, using at least a detection value of the power supply current Is and the correction amount Cq, the ON times and OFF times of a plurality of switching pulses, and controls, using the changed switching pulses, the ON/OFF operation of the short-circuit unit 30. The above configuration makes it possible to suppress variations in peak values of the power supply current Is without performing complicated calculations. Because complicated calculations are not required, the design workload of the data set in the controlling unit 20 is not increased, the processing load in the controlling unit 20 is reduced, and a delay in the short-circuit operation can be avoided. Because it is possible to suppress variations in peak values of the power supply current Is, the power factor is improved, harmonic components are suppressed, or an increase in circuit losses is suppressed.

In addition, the controlling unit 20 calculates, using an approximate formula of a function in which an inductance value and the power supply current Is are associated with each other, the correction amount Cq corresponding to a detection value of the power supply current Is, and changes the ON time and the OFF time by the calculated correction amount Cq. The above configuration makes it possible to change ON/OFF times using only the correction amount Cq derived from the formula (7) and the formula (9), and an increase in the design workload for obtaining a waveform shape, a power factor, harmonics, and a voltage boosting performance as desired is prevented.

In addition, the controlling unit 20 calculates, using an approximate formula of a function in which an inductance value and a power value are associated with each other, the correction amount Cq corresponding to a power value calculated from a detection value of the power supply current Is and a voltage detection value from the alternating-current power supply 1, and changes the ON time and the OFF time by the calculated correction amount Cq. The above configuration makes it possible to change ON/OFF times using only the correction amount Cq derived from the formula (8) and the formula (9), and thus an increase in the design workload for obtaining a waveform shape, a power factor, harmonics, and a pressure increasing performance as desired is prevented.

In addition, a map table is set in the controlling unit 20. In the map table, ON times, OFF times, pulse numbers of a plurality of switching pulses, and pulse-interval numbers of the switching pulses are associated with one another. The controlling unit 20 changes the ON times corresponding to the pulse numbers and OFF times corresponding to the pulse-interval numbers by the correction amount Cq. The above configuration makes it possible to change ON/OFF times using only the correction amount Cq and the map table, and complicated calculations are no longer required. Consequently, an increase in the design workload of data set in the controlling unit 20 is prevented.

In addition, data in which ON times and OFF times are expressed as a function based on numbers given to a plurality of switching pulses is set in the controlling unit 20, and the controlling unit 20 changes the ON times and the OFF times corresponding to the numbers given to the switching pulses by the correction amount Cq. Because control parameters stored in the data storage unit 22 are reduced by using the data expressed as the function, there is no need to use an expensive memory, the time and the burden required for reliability verification or evaluation of data can be reduced, and an increase in apparatus costs can be suppressed.

The data expressed as the function is data in which ON times and OFF times are represented by a second- or higher-degree approximate formula. With the use of such data, it is possible to further reduce the control parameters stored in the data storage unit 22. Therefore, the time and the burden required for reliability verification or evaluation of data can be substantially reduced.

The configuration given in the above embodiment illustrates an example of the content of the present invention, and may be combined with another known technology, and a part of the configuration may be omitted or changed without departing from the gist of the present invention.

The invention claimed is:

1. A power converting apparatus comprising:
a rectifier converting alternating-current power from an alternating-current power supply into direct-current power;
a short-circuit unit short-circuiting the alternating-current power supply via a reactor; and
a controlling unit controlling the short-circuit unit in a half cycle of the alternating-current power supply, wherein
a correction amount of inductance of the reactor that tends to increase with an increase in a detection value of a power supply current is set in the controlling unit, and
the controlling unit changes an ON time of a plurality of switching pulses for controlling the short-circuit unit by the correction amount, changes an OFF time of the switching pulses by the correction amount, and controls, using the changed switching pulses, an ON/OFF operation of the short-circuit unit.

2. The power converting apparatus according to claim 1, wherein the controlling unit calculates, using an approximate formula of a function in which the inductance and the power supply current are associated with each other, the correction amount corresponding to a detection value of the power supply current, and changes the ON time and the OFF time by the calculated correction amount.

3. The power converting apparatus according to claim 1, wherein the controlling unit calculates, using an approximate formula of a function in which the inductance and a power value are associated with each other, the correction amount corresponding to a power value calculated from a detection value of the power supply current and a voltage detection value of the alternating-current power supply, and changes the ON time and the OFF time by the calculated correction amount.

4. The power converting apparatus according to claim 1, wherein
- a map table is set in the controlling unit, the map table associating the ON time, the OFF time, pulse numbers of the switching pulses, and pulse-interval numbers of the switching pulses with one another, and
- the controlling unit changes the ON time corresponding to the pulse numbers and the OFF time corresponding to the pulse-interval numbers by the correction amount.

5. The power converting apparatus according to claim 1, wherein
- data is set in the controlling unit, the data expressing the ON time and the OFF time as a function based on numbers given to the switching pulses, and
- the controlling unit changes the ON time and the OFF time corresponding to the numbers by the correction amount.

6. The power converting apparatus according to claim 5, wherein the data expressed as the function is data in which the ON time and the OFF time are represented by a second- or higher-degree approximate formula.

7. The power converting apparatus according to claim 1, wherein the controlling unit includes a microcomputer.

8. The power converting apparatus according to claim 1, wherein the controlling unit reduces the ON time of the switching pulses by the correction amount.

9. The power converting apparatus according to claim 1, wherein the OFF time of the switching pulses is changed in a manner different from a change of the ON time.

\* \* \* \* \*